(12) United States Patent
Wunsch

(10) Patent No.: US 8,261,404 B2
(45) Date of Patent: Sep. 11, 2012

(54) VERTEBRA FOR WIPER WITH AT LEAST TWO WIRE ELEMENTS

(75) Inventor: Eckart Wunsch, Unterreichenbach (DE)

(73) Assignee: NV Bekaert SA, Zwevegem (BE)

( * ) Notice: Subject to any disclaimer, the term of this patent is extended or adjusted under 35 U.S.C. 154(b) by 0 days.

(21) Appl. No.: 12/999,398

(22) PCT Filed: May 26, 2009

(86) PCT No.: PCT/EP2009/056352
§ 371 (c)(1),
(2), (4) Date: Dec. 16, 2010

(87) PCT Pub. No.: WO2009/153135
PCT Pub. Date: Dec. 23, 2009

(65) Prior Publication Data
US 2011/0088192 A1    Apr. 21, 2011

(30) Foreign Application Priority Data
Jun. 19, 2008   (EP) ..................................... 08158607

(51) Int. Cl.
*B60S 1/38* (2006.01)
(52) U.S. Cl. ........... 15/250.43; 15/250.451; 15/250.361; 15/250.201; 15/250.47; 267/151; 267/229
(58) Field of Classification Search ............... 15/250.46, 15/250.47, 250.361, 250.202, 250.38, 250.43, 15/250.44, 250.451; 267/2, 151, 158, 164, 267/229
See application file for complete search history.

(56) References Cited

U.S. PATENT DOCUMENTS

| | | | | |
|---|---|---|---|---|
| 3,224,028 A * | 12/1965 | Peras et al. | ............... | 15/250.201 |
| 3,530,525 A | 9/1970 | Abel | | |
| 3,665,544 A * | 5/1972 | Sakamoto | ................... | 15/250.32 |
| 3,667,083 A * | 6/1972 | Linker | ......................... | 15/250.06 |
| 3,717,900 A * | 2/1973 | Quinlan et al. | ............ | 15/250.43 |
| 7,712,180 B2 * | 5/2010 | Hoshino et al. | ............ | 15/250.43 |
| 2007/0251044 A1 * | 11/2007 | Adriaensen et al. | ..... | 15/250.351 |

FOREIGN PATENT DOCUMENTS

| | | |
|---|---|---|
| DE | 202006015206 U1 | 1/2007 |
| GB | 619321 A | 3/1949 |
| JP | 61-146658 * | 7/1986 |
| WO | WO 2004/054860 A1 | 7/2004 |
| WO | WO 2006/024567 A1 | 3/2006 |
| WO | WO 2007/091397 A1 | 8/2007 |

* cited by examiner

*Primary Examiner* — Gary Graham
(74) *Attorney, Agent, or Firm* — Foley & Lardener LLP

(57) ABSTRACT

The present invention provides a wiping blade (30) for removing water from a surface having one or more vertebrae (32, 34, 36, 38) comprising at least one rail (32, 34) and at least one spring (36, 38), wherein said rail (32, 34) is curved and provides an elastic force quasi perpendicular to the windscreen, and said wire spring (36, 38) is fitted to said rail over its entire length or a part thereof and provides an elastic force in the direction of the length of the vertebra.

11 Claims, 2 Drawing Sheets

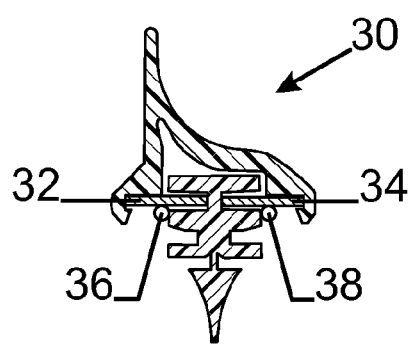
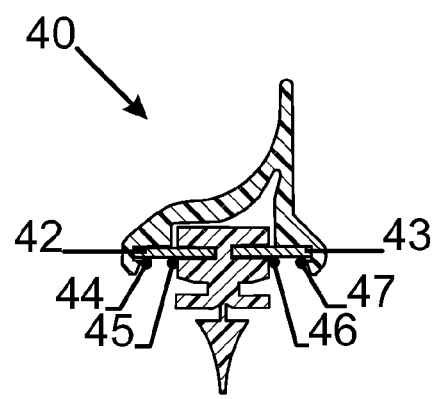
Fig. 3
Fig. 4
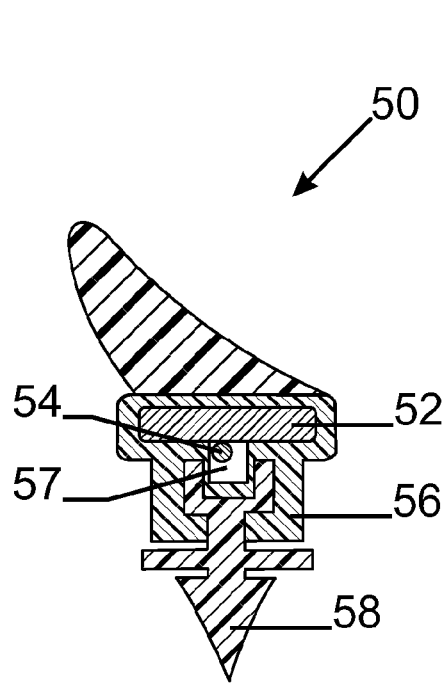
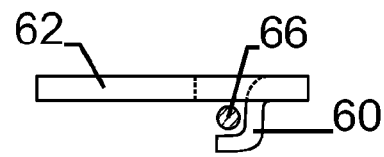
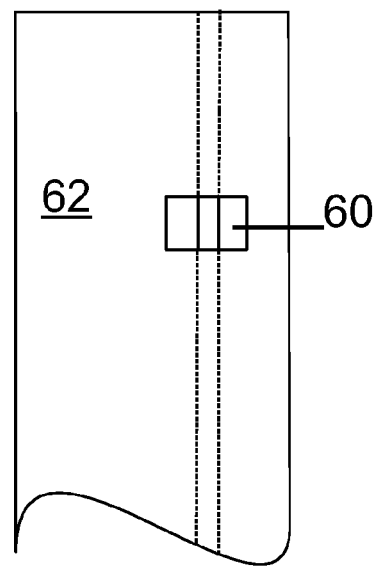
Fig. 5
Fig. 6

VERTEBRA FOR WIPER WITH AT LEAST TWO WIRE ELEMENTS

TECHNICAL FIELD

The present invention relates to the vertebra of a windscreen wiper.

The present invention also relates to a windscreen wiper comprising one or more such vertebra.

BACKGROUND ART

Windscreen wipers are provided with a vertebra and a blade rubber. The blade rubber has one or more slots or recesses to receive one or more rails. The rails may be in the form of a flattened wire or a wire with a rectangular cross-section. According to the prior art, these rails form the vertebra.

EP 1819559 by applicant also describes vertebrae having rails of different shape and rubber blades having different angled recesses for fitting in said rails.

In what is often referred to as a "flat blade", the rail is a flattened or rectangular wire or has been made of sheet metal. The rail functions as a spring which transmits forces to the blade rubber to hold the blade rubber in good contact with the surface of the windscreen. Therefore the rail is bent stronger than the glass face and acts as e.g. a leaf-spring member. There can be one or more rails in a flat blade wiper. When a pressing force from a wiper arm is applied to the blade rubber, the leaf-spring member is elastically deformed until it conforms with and fits to the glass face or surface. As such the pressing force is dispersed over the entire longitudinal-directional portion of the blade rubber. The blade rubber makes contact with the glass face with a uniformly distributed pressure.

As will be explained hereinafter with reference to the drawings, despite a number of advantages, the uniform pressure distribution in a flat blade has also some disadvantages. Compared to a traditional blade, which allows more movement and flexibility (due to its superstructure and linkages), the rubber fixes extremely well. This rigid design does not always lead to an improved wiping performance. At low speeds of driving, the blade has full contact with the window screen. As driving speed of a vehicle increases, the wind forces tend to lift the wiper blade. Due to this lifting, the vision area is no longer sufficiently covered by the wiper. Additionally, the behaviour of a flat blade at the points of reversal, i.e. the upper and lower dead centers of the blade, may be improved.

DISCLOSURE OF INVENTION

It is a first object of the present invention to avoid the drawbacks of the prior art.

It is a second object of the invention to decouple the vertical and lateral forces of a wiper to a large extent.

It is a further objective of the invention to decrease the rigidity of a flat blade wiper.

It is another object of the invention to provide vertebrae with an improved pressure distribution, faster and at low cost.

It is also an object of the invention to provide optimum contact with the screen to be wiped and optimum flip-over flexibility.

It is yet another object of the invention to provide vertebrae having optimum rigidity during the entire wiping process.

It is still another object of the present invention to build in some flexibility in the design of a vertebra for a wiper.

The present invention provides a wiping blade for removing water from a surface having one or more vertebrae comprising a rail and a spring wire. The wire spring provides an additional force perpendicular to the windscreen. The wire spring is arranged along and under the rail. Thanks to the additional wire or spring, it is possible to apply vertical contact pressure and lateral forces independently of the thickness of the rail. The vertical and lateral forces can, to a certain extent, be decoupled from each other. Additionally, as will be explained hereafter, the additional wire or spring offers an increased flexibility in the design of wipers.

WO 2004/054860 describes multipurpose use of wiper blades to window glasses with different curvatures, such as e.g. the window glass at the side of the driver and that of the passenger side. The wipers comprise flat rails. Additional second wire-like spring members with different curvature for each of the sides are applied in the rubber holder of the corresponding wiper blades. An elastic deformation in the direction that is perpendicular to the front glass is possible, but the elastic deformation in the sweeping direction is regulated. The flat rails have freedom of elastic deformation in the direction that is perpendicular to the window glass. The spring force of the wire spring member is compensated by the spring force of the flat rails. The combined spring force of the rod spring member and the vertebrae establishes the pressure that is distributed to the front glass by the blade rubber.

The present invention combines the lateral stiffness of a flat rail with the vertical spring force, i.e. in a direction perpendicular to the window, of an additional spring or of an additional wire. In difference with WO 2004/054860, the spring or wire may be attached to the rail. Another difference is that the force of the spring or wire does not need to be discontinuous.

Furthermore, in the prior art WO 2004/054860, a number of holding frames, or bridge members, are needed for connecting the wire-like spring members, and the wire spring members are bent in the form of a crank for fixing to a holding frame. The holding frames act as deformation regulating members, generating a force that presses the blade rubber to the front glass. The force of the wire spring member, which is discontinuous, is compensated by the continuous elastic force of the vertebra. Two or even three wire spring members are added to a wiper blade.

The design of WO 2004/054860 is a very complicated design. In contrast herewith, the present invention aims at providing a much simpler and cost-effective design, whereby replacing the vertebrae is also very easy.

WO2007/091397 discloses a vertebra for a wiper blade comprising one or more rails. In order to have more elasticity each rail may be provide with an additional auxiliary rail attached to the upper surface of the rail. The auxiliary rail is fixedly attached at one end and free at its other end.

According to a first aspect of the present invention, there is provided a vertebra for a windscreen wiper comprising at least one rail and at least one wire spring. The rail has a bent form in an unsolicited state so that it provides an elastic force quasi perpendicular to the windscreen. The wire spring is attached to the under side of the rail so that the wire spring provides an additional force perpendicular to the windscreen.

The rail is made of a drawn or rolled steel wire, plain carbon steel, hardened and tempered steel, or stainless steel, or of a metal sheet. The rail may be provided with a corrosion resistant coating such as zinc, a zinc aluminium alloy (e.g. with 3 wt % to 10 wt % aluminium) or with a zinc-aluminium-magnesium alloy. Alternatively or in addition thereto, the rail may be provided with an organic polymer coating such as polyamide or polyester. Uncoated rails exist as well, e.g. rails of tempered martensitic steel.

In a particular embodiment the wire spring is a stainless steel wire or a high carbon steel wire. The steel wire spring may have a round, square, rectangular or flattened cross-section. The round cross-section is the preferable embodiment. The steel wire or spring may be provided with a corrosion resistant coating such as zinc, a zinc aluminium alloy (e.g. with 3 wt % to 10 wt % aluminium) or with a zinc-aluminium-magnesium alloy.

Alternatively or in addition thereto, the spring or wire may be provided with a polymer coating such as polyamide or polyester.

According to the prior art, the flat rail did provide the lateral stiffness and the perpendicular spring function. In the context of the present invention, these two properties and functions are now split to a certain extent. The lateral stiffness is still provided by the flat rail but the perpendicular spring function is at least partially taken over by the additional spring or wire.

The wire spring may be a meander spring or a conventional spring.

In one embodiment of the invention, the rail has a reduced thickness over its entire length or a section thereof, in comparison with a vertebra having only said rail and no wire spring.

In a preferable embodiment, the vertebrae of the present invention are used in a windscreen wiper of a vehicle.

According to a second aspect of the present invention, there is provided a windscreen wiper comprising one or more vertebrae according to the first aspect of the present invention.

The advantages of the present invention are multiple, the main advantage being a partial decoupling of vertical and lateral forces and the associated increased degree of flexibility in the design and functioning of the wiper combined with excellent wiping efficiency. The wiper can be easily customized. Furthermore, the wiper blade design is simple and light weight, which is cost effective.

An additional advantage is that due to the action of the wire spring, the force exercised by both ends of the rail to the window screen is increased, which improves wiping efficiency particularly at high speeds since the chances for lifting is reduced.

The wiper blade design is very compact, meaning that the field of vision area of the driver can be improved.

No additional deformation regulating blocks are needed in the design of the present invention. The spring takes all the deformation forces in both vertical and longitudinal/lateral direction.

Moreover, the vertebrae of the present invention have the possibility of fine-tuning the properties of the blade as such, either per blade or per blade section or per wiper.

Indeed as of today vehicle manufacturers require that all vertebrae are always identical per vehicle, resulting in scrap each time a vertebra does not correspond to the specifications. According to the present invention, the flat rail may have a reduced thickness and reduced spring function perpendicular to the window, so that the specifications are easier met.

BRIEF DESCRIPTION OF FIGURES IN THE DRAWINGS

FIG. 1a shows a flat blade wiper according to the prior art;
FIG. 1b shows a traditional wiper according to the prior art;
FIG. 2a and FIG. 2b illustrate the principle of the working of the vertebra according to the invention;

FIG. 3 shows a cross-section of a wiper according to the present invention comprising a specific embodiment of a vertebra.

FIG. 4 shows a cross-section of an alternative embodiment of a wiper according to the present invention;

FIG. 5 shows a cross-section of a still another alternative embodiment of a wiper according to the present invention;

FIG. 6 shows a cross-section and a bottom view of a slotted hole and hook for fixing a wire spring to a vertebra.

MODE(S) FOR CARRYING OUT THE INVENTION

Figure 1A:
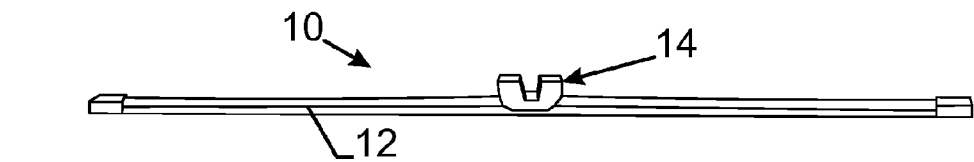

A so-called flat blade has a blade body connected to a wiper arm. The blade body supports a rubber element that wipes the windshield. In order to keep the rubber element in uniform contact with the windshield, a metal vertebra or more vertebrae, engaging with the blade body and/or the rubber element, is or are mounted inside a mounting channel of the rubber. The vertebra comprises a flat rail over the entire length of the wiper for providing pressure against the surface to be wiped. FIG. 1a illustrates such a flat blade 10. There is only one connection between the blade 12 and the wiper arm (not shown). This contact 14 is usually but not necessarily in the middle of the blade 12.

The metal vertebra passes lengthwise through the blade body and has a curved cross-sectional shape. One or more vertebrae may be provided in a single wiper blade.

Figure 1B:
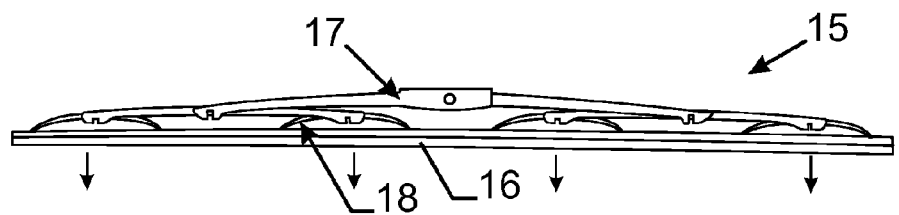

FIG. 1b illustrates a traditional wiper 15 with its more complex structure. The action of the wiper arm (not shown) is translated to the blade 16 through a branched structure of various arms 17, 18. In the typical example of FIG. 1b, there are four points on the windscreen with a high pressure. The pressure in between is lower.

In contrast herewith flat blades 10 provide a uniformly distributed pressure to the windshield along the length of the wiper and are fairly rigid. During wiping this high and homogeneous pressure is an advantage. However, this homogeneous pressure causes the rubber tip to raise at high speeds with a decreased wiping performance. At the reversal points, to sudden flip over as a result of the rigid structure may create noise.

An improved wiping performance is now realized by decreasing the overall and vertical rigidity of the rail and by decoupling the vertical and lateral rigidity of said vertebrae.

The term "vertical rigidity" means the rigidity in the direction towards the windshield, also referred to as providing a vertical (elastic or spring) force in the present invention.

The term "lateral rigidity" means the rigidity in the plane of the windshield.

Figure 2A:
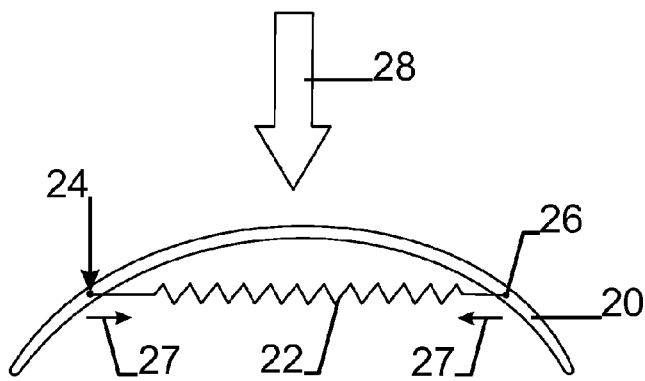
Figure 2B:
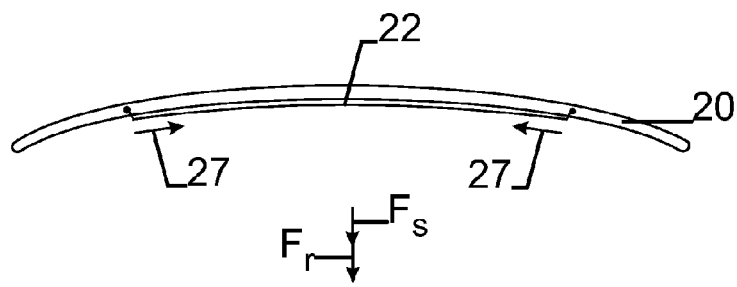

FIG. 2a illustrates the vertebra according to the invention in a position remote from the window screen. The vertebra has a flat rail 20 which has a bent form in an unsolicited state, even without a wire spring. A wire spring 22 is fixed to the rail at points 24 and 26, i.e. between the half of the rail 20 and both ends of the rail 20. The wire spring 22 exercises a tensile force in the direction of arrows 27 so that the rail 20 shows a yet more pronounced bent form. A wiper arm (not shown) then exercises a force 28 to the vertebra 20, 22 so that it fits on a window screen. FIG. 2b shows the position of the vertebra in contact through the rubber (not shown) with the window screen (not shown). The rail 20 as such, i.e. taken in isolation, exercises a force $F_R$ to the window screen. In addition to this force $F_R$, a force $F_S$ is exercised by the wire spring 22. Hence, in order to come to a force $F_R + F_S$, the thickness of the rail 20 can be considerably reduced, since the rail must only provide force $F_R$. As a matter of example only, it has been possible to reduce the thickness of rail 20 from 0.90 mm to 0.50 mm thanks to the addition of the wire spring 22.

The present invention provides a new type of vertebra for a wiper blade that represents different characteristics during wiping and during flip-over. FIG. 3 shows a cross-section of a wiper according to the present invention.

In a first embodiment a vertebra is provided comprising two rails 32, 34 and two additional springs 36, 38.

As a matter of example only, the two rails 32, 34 may be flat wires or metal sheets with a reduced thickness: 7 mm×0.7 mm instead of e.g. 7 mm×0.9 mm. The reduction in thickness from 0.9 mm to 0.7 mm reduces the vertical rigidity of the rails 32, 34 by 50%. The additional wire springs 36, 38 work as a tandem spring with the rails 32, 34. An additional advantage of this thickness reduction is weight reduction.

Other examples are:

6.00 mm×0.80 mm could become 6.00 mm×0.63 mm
7.00 mm×1.00 mm could become 7.00 mm×0.80 mm
9.00 mm×0.90 mm could become 9.00 mm×0.70 mm.

In a preferable embodiment a vertebra is provided having a reduced rail core wire thickness. Bending e.g. a thinner flat vertebra wire may contribute to more process stability, e.g. consistent shaping, and offset the additional cost for the support spring.

The core thickness of a rail may gradually be reduced towards the ends of the vertebra.

FIG. 4 shows a cross-section of another embodiment of a wiper 40 according to the invention. Here the vertebrae have two rails 42 and 43 and under each rail two wire springs 44, 45, 46, 47 are positioned.

FIG. 5 shows a cross-section of still another embodiment of a wiper 50 according to the invention. This embodiment is a single-spline wiper where the vertebra has only one rail 52. A wire spring 54 is fixed under the rail 52. A plastic holder 56 is positioned around the rail 52 and the wire spring 54 and contains hole 57 for allowing the wire spring 54 to extend in case the wiper is removed from the window screen, as in position of FIG. 2a. A rubber 58 is attached to the plastic holder 56.

The wire spring can be fixed to the rail in various ways and at various places. The wire spring can be hooked in a groove at positions −1 and +1 of the rail, i.e. at the end positions of the rail, wherein the length between the middle of the rail and each end of the rail is taken as 1. Yet other means of fixation comprise hooking the wire spring into the groove at −1 and +1 or clamping it into the groove at −1 and +1. Instead of fixing the wire spring at the ends of the rail at −1 and +1, the wire spring may be preferably fixed to the rail at positions in-between, e.g. at positions −0.5 and +0.5, i.e. at the midpoint between the middle of the rail and each end of the rail, or at −0.75 and +0.75, i.e. at a point located three quarters of the way from the middle of the rail to each end of the rail.

Still another means of fixation or of guiding is to stamp out a slotted hole 60 in the flat rail 62 and hook in the wire spring 66, as shown in FIG. 6. Hereby the rail stiffness is deliberately weakened, which is not necessarily bad since it may contribute to reach the desired more flexible spring properties. The advantage of hooks is that no additional parts, such as e.g. guide blocks, are needed.

Any other suitable means of fixation, such as e.g. clips, a tube (half pipe) attached over a certain length of the vertebrae, or even welding or glueing, is incorporated in the present invention.

The position on the vertebra where the fixation means are placed may further influence an even distribution of the spring load to the vertebrae. Alternatively, the fixation means may influence a preferred uneven pressure distribution along the length of the wiper blade.

Both wiper blades of a front windscreen may have different characteristics, e.g. different vertebrae, depending on the parcours the blade has to make on the windscreen. As such, costs can be saved by simplifying one of the two blades. More or less vertical pressure can be applied at the ends of the rails.

A stopper may be added to hold the vertebra in place at the end of the wiper blade. The stopper may also have the function of regulating the length changes of the wiper due to the lateral forces of the wiper blade.

Accordingly the properties of a wiper blade can easily be changed by changing the properties of the vertebrae, rail and/or spring. Blade rubbers can easily be detached and attached from rubber holders, so that vertebrae, rails and/or springs can be replaced by ones with different properties. In this form of execution, both wiper blades of the front windscreen can have different properties. Wiper blades can also be made to correspond with glass surfaces with various curvatures by changing the properties of the vertebrae.

A rail according to the invention can be made starting from a wire steel rod with a carbon content varying between 0.60 and 0.90 weight percent. The wire rod is hard drawn until an intermediate diameter. The hard drawn wire is thereafter rolled until the desired final profile is obtained. This rolling can be done by means of rolls or by means of Turk's heads. Alternatively the wire can be drawn through a series of profile dies until the final profile is obtained.

Alternatively, the rail can be made of sheet metal.

In a preferable embodiment of the invention, the wire is hardened and tempered so that a martensitic structure is obtained. The steel for such a wire comprises small amounts of chromium, silicon and vanadium. The rail made of such a wire has the advantage of having a high degree of hardness and a high degree of fatigue resistance.

A corrosion protection can be provided by galvanizing the steel wire in a bath of zinc or of a zinc alloy, such as zinc aluminum. The zinc coating can also by applied in an electro-galvanizing process. The amount of aluminum in the zinc aluminum alloy may vary between 1% and 10%, e.g. between 2% and 8%. For example, a zinc aluminum coating with a thickness varying between 50 μm and 80 μm (25 g/m2 to 60 g/m2) can be given to the steel wire.

Alternatively, or in combination with the zinc alloy coating, a polymer coating can be given to the steel wire, e.g. by means of an extrusion process.

Commonly the vertebra has a length varying from 450 to 550 mm for windscreens of passenger cars and going up to 850 mm for windscreens of trucks or vans. In both cases the blade rubber needs to be held in close contact with the surface of the windscreen during the process of wiping.

Blade materials of the invention should include all known elastomers (natural rubber, chloroprene rubber, synthetic compounds, silicones), which allow flexible mapping of a surface plane, both flat and other.

Types of blades may include single and multiple blades, . . . .

A rail preferably and typically has a flattened or rectangular cross-section, but other types of cross-sections are not excluded.

Suitable materials for a spring or wire according to the invention can be based on stainless steel wires, plain carbon steel wires or other suitable metals which are normally used for springs.

A meander spring may be replaced by a conventional spring or any other suitable kind of spring, e.g. a spring wire.

The present invention can be applied to the wiper blades used in wiper apparatus of various types, such as tandem types or opposes-wiping types of a vehicle or the like. The blade may be used individually or as part of a multi-blade arrangement. The wiping blade may be operated by hand for example a squeegee, or by mechanical means for example in a windscreen wiper of a vehicle.

While the present invention has been illustrated and described with respect to particular embodiments thereof, it should be appreciated by those of ordinary skill in the art that various modifications to this invention may be made without departing from the spirit and scope of the present invention.

The invention claimed is:

1. A vertebra for a windscreen wiper, said vertebra comprising:
    at least one curved rail, said at least one curved rail being curved in its natural state such that the at least one curved rail is configured to provide a force on a windscreen in a direction perpendicular to the windscreen; and
    at least one wire spring, said at least one wire spring being attached to an underside of said at least one curved rail at two discrete points, a first point between a middle of the curved rail and a first end of the curved rail, and a second point between the middle of the curved rail and a second end of the curved rail,
    wherein the at least one wire spring is in tension in a longitudinal direction of the at least one wire spring, such that the at least one wire spring exerts a force on the at least one curved rail that acts to bend the at least one curved rail, whereby the at least one wire spring is configured to provide an additional force on the windscreen in the direction perpendicular to the windscreen.

2. A vertebra according to claim 1, wherein ends of said at least one wire spring are fixedly fitted to said at least one curved rail.

3. A vertebra according to claim 1, wherein said at least one wire spring is a meander spring or a conventional spring.

4. A vertebra according to claim 1, wherein said at least one curved rail is made of a drawn or rolled steel wire, plain carbon steel, hardened and tempered steel, stainless steel, or sheet metal.

5. A vertebra according to claim 1, wherein said at least one curved rail has a rectangular or flattened cross-section.

6. A vertebra according to claim 1, wherein said at least one wire spring comprises two or more wire springs having different spring characteristics.

7. A vertebra according to claim 1, wherein said at least one wire spring is fixed to said at least one curved rail by at least one attachment device selected from the group consisting of guide blocks, hooks fitting in slots or holes of the at least one curved rail, tubes on the at least one curved rail or grooves of a rubber element, clips, and glue.

8. A windscreen wiper comprising at least one vertebra according to claim 1.

9. A vertebra according to claim 1, wherein a cross-sectional area of said at least one curved rail is greater than a cross-sectional area of said at least one wire spring.

10. A vertebra according to claim 1, wherein said at least one wire spring has a round cross-section.

11. A vertebra according to claim 1, wherein said at least one wire spring has a square or rectangular cross-section.

* * * * *